May 24, 1932.  W. F. STIMPSON  1,860,211
TOOL GRINDER
Filed Oct. 15, 1928   2 Sheets-Sheet 1
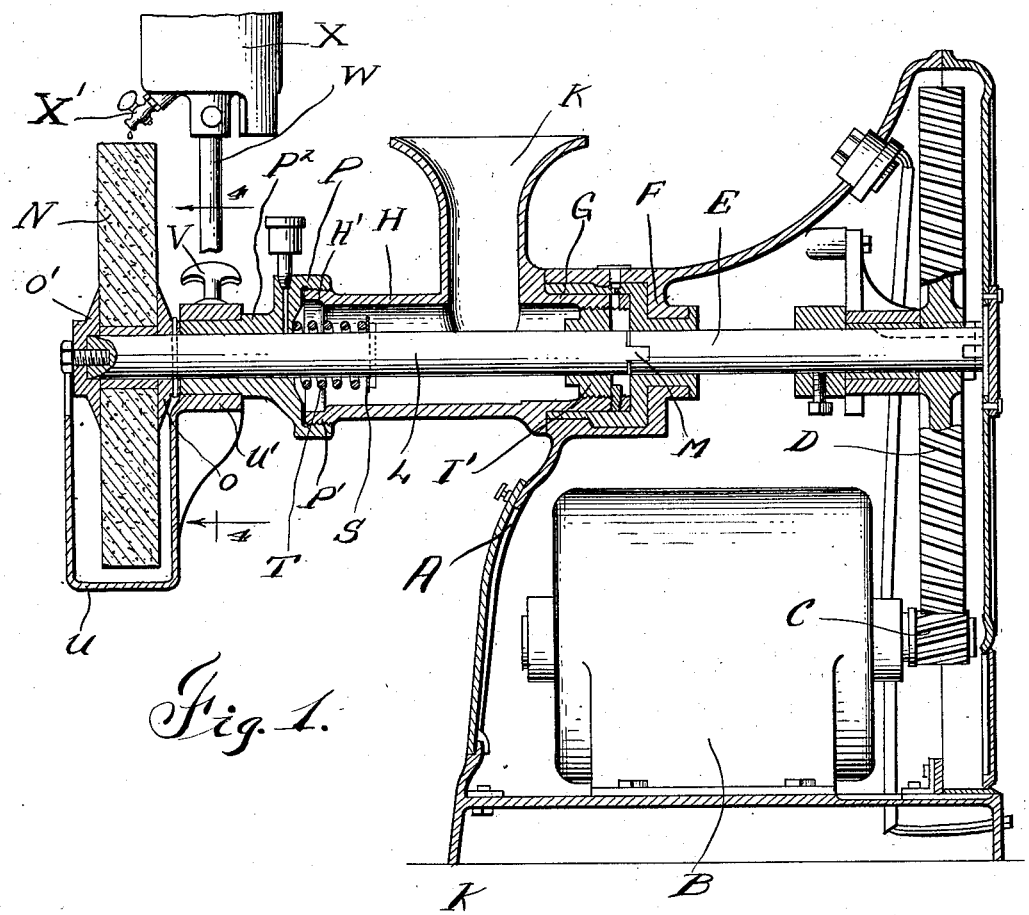
Fig. 1.
Fig. 2.
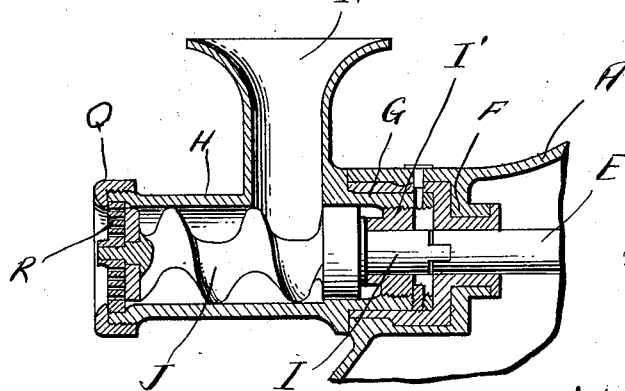
Inventor
Walter F. Stimpson
By Whittemore Hulbert
Whittemore & Belknap
Attorneys

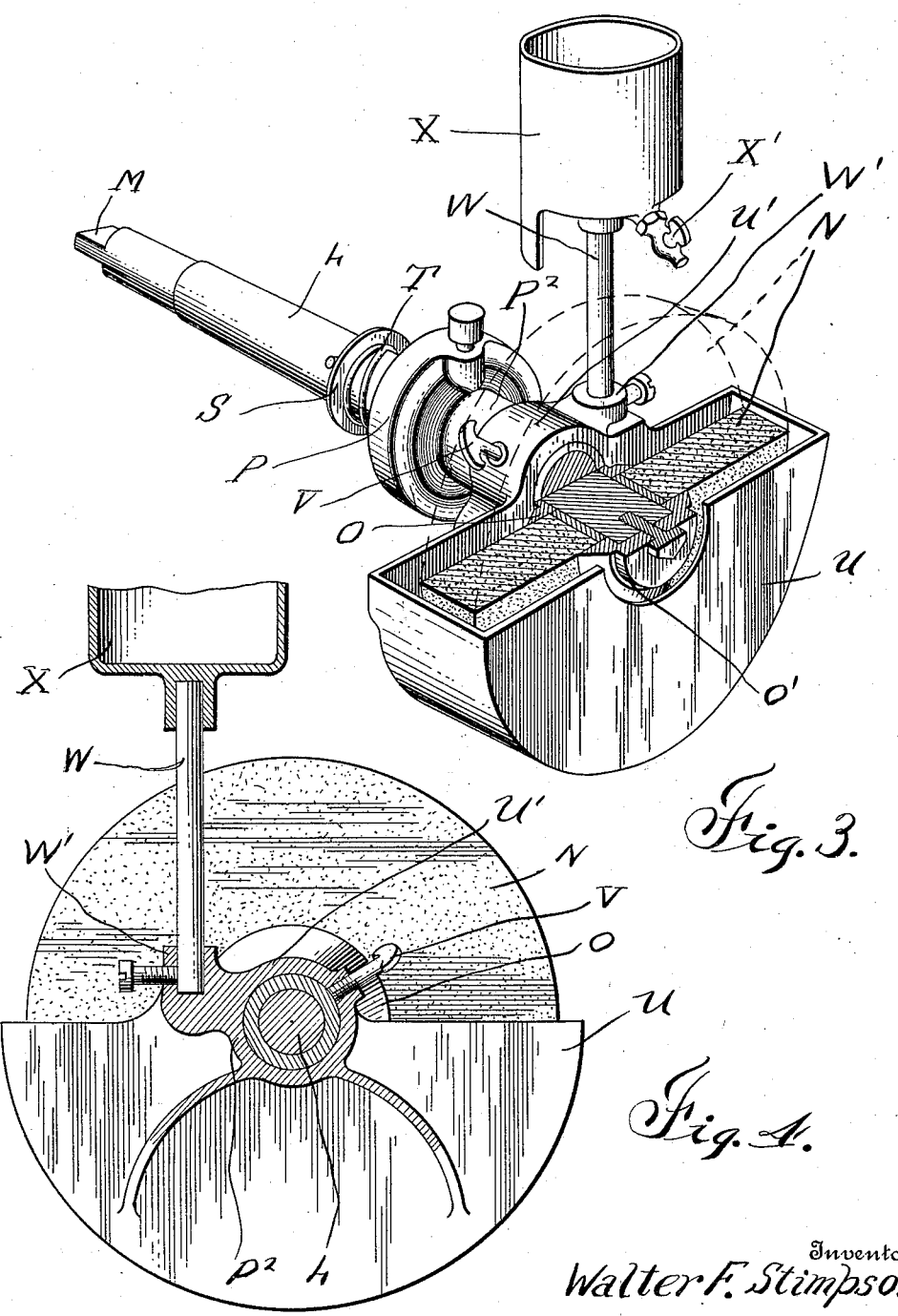

Patented May 24, 1932

1,860,211

UNITED STATES PATENT OFFICE

WALTER F. STIMPSON, OF LOUISVILLE, KENTUCKY

TOOL GRINDER

Application filed October 15, 1928. Serial No. 312,632.

This invention relates to grinders and more particularly to a construction of attachment for a meat grinder through which this machine may be used for the sharpening of knives and other tools. To this end the invention consists in the construction as hereinafter set forth.

In the drawings:

Figure 1 is a vertical longitudinal section through a motor driven meat grinder to which my improvement is applied.

Figure 2 is a similar view of the meat grinder without the attachment.

Figure 3 is a perspective view of the grinder attachment.

Figure 4 is a cross section through the attachment showing the grinder in elevation.

The power driven meat grinder to which my attachment is applied comprises essentially a housing A enclosing an electric motor B which transmits its power through a pinion C and large gear wheel D to a shaft E above the motor. This shaft E is aligned with a socket F in the housing A, which socket receives the shank G of the meat grinder casing H. The shaft E is also adapted for coupling engagement with the shaft I of the screw or worm J which feeds the meat from the hopper K to the cutters at the outer end of the casing H, said shaft I being journaled in a bearing I' in the inner end of the casing H which holds it in substantial alignment with the shaft E. The parts thus far described form no part of the present invention but only the machine to which my improved grinding attachment may be applied, and which latter is of the following construction: L is a shaft which is adapted for insertion through the meat grinder housing H when the feed worm J is removed, and having at its inner end a coupling tongue or spline M for engagement with a keyway in the end of the shaft E. The shaft L forms an arbor on which is mounted the grinder wheel N through the medium of clamping collars O and O'. P is a cap member which forms a replacement for the cap member Q of the meat grinder, which latter holds in position the cutter R and feed worm J. The cap P has an internally threaded flange P' which engages the externally threaded portion H' of the meat grinder casing. It is also provided with an outwardly extending portion P² which forms a journal bearing for the shaft L and the outer end of which abuts against the collar O. S is a collar upon the shaft L which forms an abutment for a coil spring T sleeved on the shaft L and bearing with its opposite end against the inner face of the cap P. This serves to yieldably hold the shaft with the collar O bearing against the outer end of the journal bearing P² but permits of an outward movement of said shaft against the tension of the spring. U is a guard or housing for the grinder wheel N which is provided with a sleeve portion U' engaging the bearing P². V is a thumb screw for clamping the sleeve U' upon the bearing P². W is a rod or post rising from a socket W' in the sleeve U' and X is a receptacle for water mounted on the upper end of the post W. X' is a cock for discharging water from the receptacle X on to the grinder wheel or the work which is being ground.

With the construction as described, whenever it is desired to use the tool grinder the cap Q of the meat grinder is removed, permitting of removal of the cutter R and feed screw J. The shaft L is then inserted through the casing H with its inner end engaging the bearing I' holding it in alignment with the shaft E, and the cap P is then screwed upon the outer end of the casing H until tight. If the spline or key end in the shaft L does not register with the keyway M of the shaft E, the shaft L will be forced outward in its bearing P², this being permitted by the yielding of the spring T. As soon, however, as rotary movement is imparted to the shaft E the spline and keyway will come into registration and the spring T will force them into engagement. When the cap is screwed on to the casing it may happen that the housing U will not be properly positioned or the post W arranged in vertical position. This may be corrected by loosening the set screw V and turning these parts to the proper position.

When the motor is set in operation the grinder wheel will be driven and may be used for sharpening knives or other work, while the water in the receptacle X is discharged through a cock X' on to the work.

The attachment may be removed by simply unscrewing the cap P and withdrawing the shaft L, after which the meat grinder parts may be replaced and the machine used for its normal function.

What I claim as my invention is:

1. The combination with the housing and power devices of a meat grinder comprising a hollow casing and a shaft at the inner end of said casing in axial alignment therewith and having a stepped end portion for engagement with the grinder feed screw, of a tool grinder attachment comprising a cap having a detachable engagement with the outer end of said hollow casing, a shaft journal bearing integral with said cap, a shaft engaging said bearing and extending inward through said hollow casing having a stepped inward end for engaging the stepped portion of said first mentioned shaft, a grinder wheel mounted on the outer end of said last mentioned shaft and means for yieldably pressing said last mentioned shaft inward whereby it is permitted to automatically engage the stepped portion with the corresponding stepped portion of the first mentioned shaft.

2. The combination with the housing and power devices of a meat grinder comprising a hollow casing and a shaft at the inner end of said casing in axial alignment therewith provided with a stepped end portion for engagement with the grinder feed screw, of a tool grinder attachment comprising a cap having a detachable engagement with the outer end of said hollow casing, a shaft journal bearing integral with said cap, a shaft engaging said bearing and extending inward through said hollow casing being provided at its inner end with a stepped portion for engaging the stepped portion of the first mentioned shaft, a grinder wheel mounted on the last mentioned shaft adjacent to the outer end of said journal bearing, a spring sleeved on said shaft on the inner end of said journal bearing and an abutment for said spring on said shaft whereby it is yieldably pressed inward to automatically engage its stepped portion with the corresponding portion of the first mentioned shaft.

In testimony whereof I affix my signature.

WALTER F. STIMPSON.